Sept. 1, 1953          H. C. BUJAK          2,650,484

POWER TRANSMISSION

Filed May 29, 1947

INVENTOR.
HENRY C. BUJAK
BY
ATTORNEY

Patented Sept. 1, 1953

2,650,484

UNITED STATES PATENT OFFICE 2,650,484

POWER TRANSMISSION

Henry C. Bujak, Detroit, Mich., assignor to Vickers Incorporated, Detroit, Mich., a corporation of Michigan Application May 29, 1947, Serial No. 751,221

5 Claims. (Cl. 64—23)

This invention relates to power transmissions, particularly to those of the type comprising two or more fluid pressure energy translating devices, one of which may function as a pump and another as a fluid motor.

The invention is generally concerned with a means for transmitting power from a driven to a driver unit, or vice versa, and is particularly concerned with a device which not only provides positive locking of a main shaft to a coupling shaft, but in addition, provides a flexible connection between the shafts.

It is well known that in connecting driven and driver shafts of power unit to each other that it is desirable to provide for misalignment of the shafts. Where the shafts are positively locked to each other and the connection is not a flexible one, misalignment of the shafts creates an extra heavy load burden. Where the shafts are flexibly connected to each other to provide for misalignment thereof and the shafts are not positively locked to each other, under some conditions, such as high speed and heavy load, vibration causes the shafts to move out of position in relation to each other.

It is therefore an object of the present invention to provide a device for positively locking a coupling shaft to a main shaft which is unaffected by vibration.

It is a further object of the present invention to provide a device for not only positively locking, but at the same time flexibly connecting a coupling shaft to a main shaft to compensate for misalignment of a shaft adapted to be connected to the main shaft.

It is also an object of this invention to provide a flexible and positive locking connection device between a main shaft and a coupling shaft which is well suited to low cost, large quantity production and which will give a long and useful life in spite of repeated use.

Further objects and advantages of the present invention will be apparent from the following description, reference being had to the accompanying drawing wherein a preferred form of the present invention is clearly shown.

Figure 1:
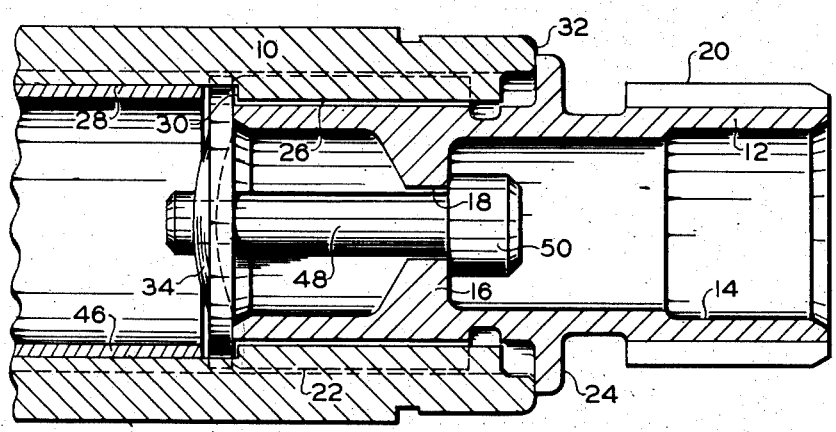
Figure 1 is a sectional view of a main shaft and coupling shaft embodying a preferred form of the present invention.

Referring now to Figure 1, there is shown a main shaft 10, such as of a hydraulic pump or motor, mechanically connected to which is a coupling shaft 12. The coupling shaft 12 is provided with a bore 14 extending completely therethrough which is divided by a wall 16 having a centrally located screw hole 18. The coupling shaft 12 is also provided with male splines at the right and left ends thereof indicated by the numerals 20 and 22 between which is located a land 24.

The main shaft 10 is provided with a splined bore 26 having a counterbore 28 forming a shoulder 30. The splined teeth of the coupling shaft 12 to the left of the land 24 are preferably adapted to mesh loosely with the splined teeth of the bore 26 so as to permit a slight relative radial movement of the shafts. The insertion of the coupling shaft 12 within the shaft is limited by the right end surface of the shaft 10, indicated by the numeral 32, forming an abutment for the land 24 of the shaft 12.

Figures 2, 3:
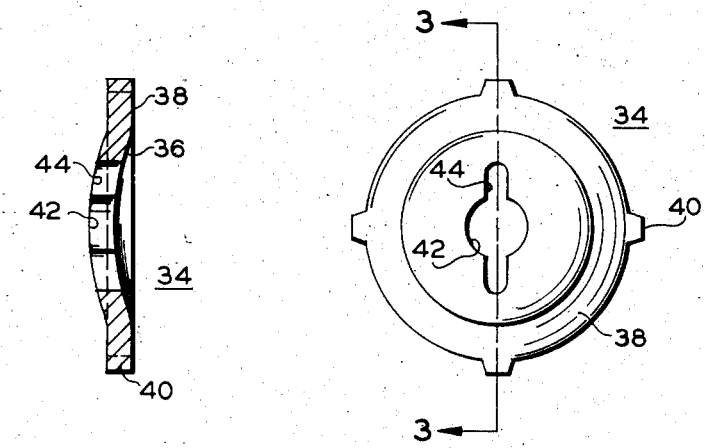
Figure 2 is a front view of a preferred form of the present invention.
Figure 3 is a sectional view taken on line 3—3 of Figure 2.

Mounted within the splined bore 28 of the shaft 10 is a metallic disk or stop nut 34 shown more clearly in Figures 2 and 3. The nut 34 is concave in shape in the center but is flat at the rim, the concave portion being indicated by the numeral 36 and the rim by the numeral 38. Formed on the rim portion 38 of the disk 34 are a plurality of teeth 40 which are adapted to mesh loosely with some of the teeth of the bore 28 so as to prevent rotation of the disk but so as to permit a slight relative radial movement between the disk 34 and the shaft 10. The disk 34 is also provided with a centrally located threaded screw hole 42 having a slot 44 for a purpose hereinafter described. Stationarily mounted in the splined counterbore 28 is a hollow sleeve 46, which maintains the disk 34 within the shaft 10. The disk 34 may be easily mounted in the main shaft at the time of assembling the unit to which the main shaft is connected, and may be utilized for the connecting thereto of a coupling shaft, such as is shown. When needed, all that is necessary to connect the coupling shaft 12 to the main shaft 10 is a screw 48, such as is shown, having a head 50 with a larger diameter than the diameter of the hole 18.

It should be noted that the tooth tip diameter of the splined bore 26 of the main shaft 10 is greater than the tooth root diameter of the lock nut 34 thus providing a shoulder abutment against which the lock nut 34 may bear. In addition, the tooth root diameter of the lock nut 34 is slightly less than the tooth tip diameter of the splined counterbore 28.

When the screw 48 is threaded into the disk 34, the latter is drawn towards the right end of the coupling shaft in abutment against the left end of the coupling shaft 12. The slot 44 permits a deflection of the concave section 36 of the disk 34 resulting in a tight and clamped grip of the nut threads on the screw threads. With leftward movement of the coupling shaft 12 limited by the abutment 32, the axial movement of the coupling shaft is actually determined by the length of that portion of the coupling shaft 12 extending beyond the shoulder 30.

Thus, the lock nut construction positively locks the coupling shaft to the main shaft and as the lock nut is free to move slightly radially and axially, the device provides both a positive locking means unaffected by vibration and a flexible coupling connection to compensate for misalignment of a shaft of a unit adapted to be connected to the coupling shaft.

It should also be noted that the disk 34 is adapted to low cost large quantity production because it may be made entirely by stamping with the exception of the threading of the punched hole. The disk is also adapted to be continually used in spite of continued connection and disconnection of the unit with which it is associated.

While the form of embodiment of the invention as herein disclosed constitutes a preferred form, it is to be understood that other forms might be adopted, all coming within the scope of the claims which follow.

What is claimed is as follows:

1. In combination a main shaft having a female spline, a coupling shaft having a male spline in mesh with the female spline, a locking element mounted in the female spline, said element comprising a concave disk having a flat rim and provided with a slotted threaded hole, and screw means associated with the coupling shaft and threaded into the disk for locking the nut on the screw and mechanically connecting the coupling shaft to the main shaft.

2. In combination a main shaft having a female spline, a coupling shaft having a male spline in mesh with the female spline, an axially shiftable lock nut mounted within the female spline, said lock nut comprising a concave disk provided with male splines and a threaded slotted screw hole, the tooth root diameter of the lock nut being slightly less than the tooth tip diameter of the latter, means associated with the main shaft providing two oppositely facing abutments, one of which limits axial movement of the lock nut in one direction and the other of which limits axial movement of the coupling shaft in the other direction and screw means associated with the coupling shaft threaded into the lock nut for mechanically connecting the coupling shaft to the main shaft.

3. In combination a main shaft having a female spline, a coupling shaft having a male spline in mesh with the female spline, an axially shiftable lock nut mounted in the female spline, means associated with the main shaft providing two oppositely facing abutments, one of which limits axial movement of the lock nut in one direction and the second of which limits axial movement of the coupling shaft in the opposite direction, and screw means associated with the coupling shaft and the lock nut for drawing the lock nut toward the one abutment and the coupling shaft toward the second abutment and mechanically connecting the coupling shaft to the main shaft.

4. In combination a main shaft having a female spline, a coupling shaft having a male spline in mesh with the female spline to permit a slight radial movement therebetween, an axially shiftable lock nut mounted in the female spline, said lock nut being provided with teeth adapted to loosely engage the female splines thereby preventing rotation of said lock nut but permitting a slight radial movement thereof, means associated with the main shaft providing two oppositely facing abutments, one of which limits axial movement of the lock nut in one direction and the second of which limits axial movement of the coupling shaft in the opposite direction, and screw means associated with the coupling shaft and the lock nut for mechanically connecting the coupling shaft to the main shaft, said abutments being spaced to permit a slight axial movement between the shafts when connected to each other.

5. In combination a main shaft having a female spline, an axially shiftable male splined lock nut mounted in mesh with the female spline, the tooth root diameter of the lock nut being slightly less than the tooth tip diameter of the female spline, a coupling shaft having a male spline in mesh with the female spline, means associated with the main shaft providing two oppositely facing abutments, one of said abutments limiting axial movements of the lock nut in one direction and the other abutment limiting axial movement of the coupling shaft in the opposite direction, and screw means for anchoring the lock nut to the coupling shaft for mechanically connecting the coupling shaft to the main shaft.

HENRY C. BUJAK.

References Cited in the file of this patent

UNITED STATES PATENTS

| Number | Name | Date |
|---|---|---|
| 477,625 | Detrick | June 21, 1892 |
| 1,610,758 | Downer | Dec. 14, 1926 |
| 1,770,744 | Morgan | July 15, 1930 |
| 2,085,941 | Arnold | July 6, 1937 |